US012775537B2

(12) United States Patent
Furuhata et al.

(10) Patent No.: US 12,775,537 B2
(45) Date of Patent: Oct. 27, 2026

(54) OPERATING SYSTEM DETERMINING SYSTEM AND INPUT DEVICE

(71) Applicant: ELECOM CO., LTD., Osaka (JP)

(72) Inventors: Yoshiya Furuhata, Osaka (JP); Takanori Ishii, Osaka (JP); Toshifumi Yakushinji, Osaka (JP)

(73) Assignee: ELECOM CO., LTD., Osaka (JP)

( * ) Notice: Subject to any disclaimer, the term of this patent is extended or adjusted under 35 U.S.C. 154(b) by 21 days.

(21) Appl. No.: 19/174,519

(22) Filed: Apr. 9, 2025

(65) Prior Publication Data

US 2025/0342097 A1 Nov. 6, 2025

(30) Foreign Application Priority Data

May 2, 2024 (JP) ................................. 2024-074977

(51) Int. Cl.
*G06F 11/30* (2006.01)

(52) U.S. Cl.
CPC ...... *G06F 11/3051* (2013.01); *G06F 11/3041* (2013.01)

(58) Field of Classification Search
CPC ......................... G06F 11/3051; G06F 11/3041
See application file for complete search history.

(56) References Cited

U.S. PATENT DOCUMENTS

| | | | | |
|---|---|---|---|---|
| 7,236,835 | B2 * | 6/2007 | Tanimoto | G05B 23/0213 714/48 |
| 10,402,252 | B1 * | 9/2019 | Habusha | G06F 11/221 |
| 2021/0011737 | A1 * | 1/2021 | Yu | G06F 9/4451 |

FOREIGN PATENT DOCUMENTS

| | | | |
|---|---|---|---|
| JP | 2003-177858 | A | 6/2003 |
| JP | 3613502 | B | 1/2005 |
| JP | 4710850 | B | 6/2011 |
| JP | 7055901 | B | 4/2022 |

OTHER PUBLICATIONS

Japanese Office Action issued in Japanese Application No. 2024-074977 issued Jul. 15, 2025.

* cited by examiner

*Primary Examiner* — Henry Tsai
*Assistant Examiner* — John B Roche
(74) *Attorney, Agent, or Firm* — Dilworth & Barrese, LLP.; Michael J. Musella, Esq.

(57) ABSTRACT

An operating system determining system for determining an operating system installed on a terminal to which a peripheral device is connectable, the terminal being capable of having installed at least one operating system including a first operating system configured to, in response to receiving a first signal, transmitting a second signal, includes: a transmission controller configured to cause the peripheral device to automatically transmit the first signal to the terminal in response to the peripheral device being connected to the terminal (#3); a signal determiner configured to determine whether the terminal has transmitted the second signal (#4); and an operating system determiner configured to, in response to the signal determiner determining that the terminal has transmitted the second signal, determine that the terminal has the first operating system installed (#5).

8 Claims, 5 Drawing Sheets

OPERATING SYSTEM DETERMINING SYSTEM AND INPUT DEVICE

TECHNICAL FIELD

The present invention relates to an operating system determining system configured to determine what operating system a terminal has installed and to an input device connectable to the terminal.

BACKGROUND ART

A terminal (or a computer) receives various commands from a keyboard as an input device. A keyboard has two or more keys as operation sections (or key operation sections) and transmits to the terminal a signal corresponding to a key pressed, to cause the terminal to perform a particular operation. Patent Literature 1 discloses a keyboard including numeric keys for inputting respective numeric characters. A numeric key may have the function of inputting a numeric character as well as another function. The Num Lock key serves to switch the function of each numeric key. With the Num Lock mode on, the numeric keys serve to input numeric characters.

The function of numeric keys is switchable as above if the terminal has a particular operating system (OS) installed.

CITATION LIST

Patent Literature

Patent Literature 1
JP 2003-177858 A

SUMMARY OF INVENTION

There has been a demand for a technique to allow the user to easily use an input device such as a keyboard with multiple functions as above. The present invention aims to allow the user to easily use an input device with multiple functions.

In order to accomplish the above aim, an operating system determining system as an embodiment of the present invention is an operating system determining system for determining an operating system installed on a terminal to which a peripheral device is connectable, the terminal being capable of having installed at least one operating system including a first operating system configured to, in response to receiving a first signal, transmitting a second signal, the operating system determining system including: a transmission controller configured to cause the peripheral device to automatically transmit the first signal to the terminal in response to the peripheral device being connected to the terminal; a signal determiner configured to determine whether the terminal has transmitted the second signal; and an operating system determiner configured to, in response to the signal determiner determining that the terminal has transmitted the second signal, determine that the terminal has the first operating system installed.

Connecting the peripheral device to the terminal causes the operating system determining system to autonomously determine what operating system (OS) the terminal has installed. This makes it possible to easily determine the OS of the terminal and easily control how the terminal operates in response to an operation of the peripheral device. This allows the user to easily use a peripheral device with multiple functions.

An input device as an embodiment of the present invention is an input device connectable to a terminal for use to input a command into the terminal, the terminal being capable of having installed at least one operating system including a first operating system configured to, in response to receiving a first signal, transmitting a second signal, the input device including: a transmitter configured to transmit information to the terminal and automatically transmit the first signal to the terminal in response to the input device being connected to the terminal; a signal determiner configured to determine whether the input device has received the second signal from the terminal; and an operating system determiner configured to, in response to the signal determiner determining that the input device has received the second signal from the terminal, determine that the terminal has the first operating system installed.

Connecting the input device to the terminal causes the operating system determining system to autonomously determine what operating system (OS) the terminal has installed. This makes it possible to easily determine the OS of the terminal and easily control how the terminal operates in response to an operation of the input device. This allows the user to easily use an input device with multiple functions.

The input device may further include: a plurality of first operation sections each configured to cause the terminal to perform a function; and at least one second operation section configured to cause the terminal to perform a first function or a second function, wherein with the first operating system installed, the terminal is configured to selectively perform the first function or the second function, the input device includes no function selector configured to select a function that the terminal performs in response to the at least one second operation section being operated, the input device further includes: a function mode determiner configured to, in response to the operating system determiner determining that the terminal has the first operating system installed, determine whether the terminal is in a mode to perform the second function in response to the at least one second operation section being operated; and an operation performer configured to, in response to the function mode determiner determining that the terminal is in a mode to perform the second function in response to the at least one second operation section being operated, cause the terminal to perform the first function in response to the at least one second operation section being operated.

The above configuration allows the input device to always cause the terminal to perform the first function in response to an operation, regardless of whether the terminal is in a mode to perform the first function or in a mode to perform the second function. This allows the user to easily use an input device with multiple functions.

The input device may be further configured such that the function mode determiner is configured to transmit a third signal to the terminal and determine in response to the terminal transmitting a fourth signal that the terminal is in a mode to perform the second function.

The above configuration allows the input device to easily determine whether the terminal is in a mode to perform the first function or in a mode to perform the second function. This allows the user to easily use an input device with multiple functions.

The input device may be further configured such that the at least one second operation section is a numeric key, and the first function is a number lock function.

The above configuration allows a keyboard including numeric keys to always input a numeric character into the terminal in response to a numeric key being pressed, regardless of whether the terminal is in a mode to perform the first function or in a mode to perform the second function. This allows the user to easily use an input device with multiple functions.

The input device may be further configured such that the at least one second operation section is each configured to transmit a unique operation signal to the terminal in response to being operated, the terminal is configured to, in response to receiving the operation signal, perform a function that varies between a case where the terminal is in a mode to perform the first function and a case where the terminal is in a mode to perform the second function, and the operation performer is configured to transmit a function change signal to the terminal before the at least one second operation section transmits the operation signal to the terminal, the function change signal serving to change the function that the terminal performs in response to the at least one second operation section being operated.

The above configuration allows the input device to, if the terminal is in a mode to perform the second function, switch the terminal into a mode to perform the first function and then transmit an operation signal to the terminal. The above configuration thereby allows the input device to always cause the terminal to perform the first function in response to an operation, regardless of whether the terminal is in a mode to perform the first function or in a mode to perform the second function. This allows the user to easily use an input device with multiple functions.

The input device may be further configured such that the operation performer is configured to transmit the function change signal to the terminal again after the at least one second operation section transmits the operation signal to the terminal.

The above configuration allows the input device to always cause the terminal to perform the first function in response to an operation and keep the terminal in the current mode at the same time.

The input device may further include: a third operation section configured to cause the terminal to perform a third function; and an operation performer configured to (i) in response to the third operation section being operated after the operating system determiner determines that the terminal has the first operating system installed, transmit to the terminal a first function control signal as a function control signal for causing the terminal to perform the third function and (ii) in response to the third operation section being operated after the operating system determiner determines that the terminal has an operating system installed other than the first operating system, transmit to the terminal a second function control signal as the function control signal.

The above configuration allows the input device to transmit a function control signal corresponding to the OS of the terminal as the determination result. This in turn allows the user to easily cause the terminal to perform a function corresponding to an operation of the input device.

DESCRIPTION OF EMBODIMENTS

[Terminal and Keyboard]

Figure 1:
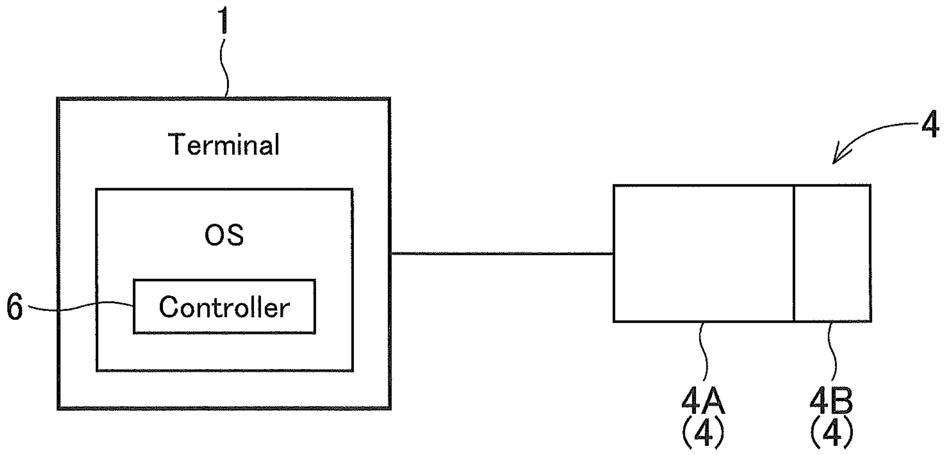
FIG. 1 is a diagram illustrating an example relationship between a terminal and a keyboard.

FIG. 1 illustrates a terminal 1 such as a personal computer with an operating system (OS) installed as basic software. The terminal 1 has an input device (peripheral device) such as a keyboard 4 connected thereto for use to input a command into the terminal 1. The terminal 1 operates in response to a command inputted with use of the input device. The peripheral device is not necessarily an input device for use to operate the terminal 1, and may be any of various devices connected to the terminal 1 to function in synchronization with the terminal 1. The terminal 1 includes a controller 6 configured to operate on the OS to control the operation of the terminal 1. The controller 6 includes a processor such as a central processing unit (CPU) configured to control the operation of the controller 6 and thus the operation of the terminal 1.

The terminal 1 has a single OS installed among other OSs. The terminal 1 may have two or more OSs installed and operate on the basis of one of the OSs. The description below may express such one of the OSs as the OS of the terminal 1.

Figure 2:
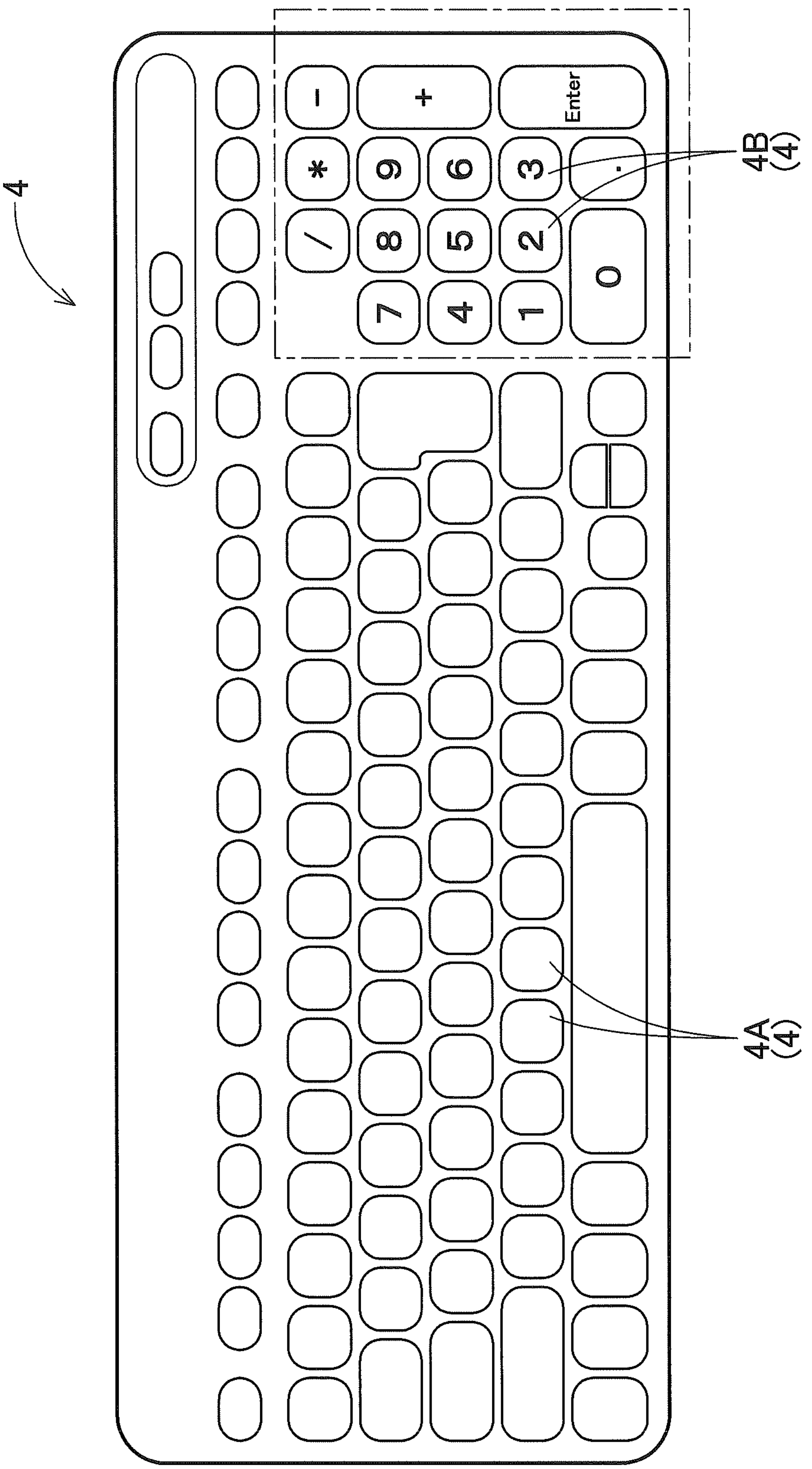
FIG. 2 is a diagram illustrating an example configuration of a keyboard.

As illustrated in FIG. 2, the keyboard 4 includes two or more keys as operation sections and is configured to, in response to a key being operated (or pressed), transmit to the terminal 1 an operation signal 8 (see FIG. 3) unique to the key. The keyboard 4 includes one or more functional keys 4A as first operation sections each for use to input, for example, an alphabetical character corresponding to the key. The keyboard 4, in response to a functional key 4A being operated (or pressed), transmits to the terminal 1 an operation signal 8 unique to the key. The terminal 1, in response to receiving the operation signal 8, performs a first function corresponding to the operation signal 8. In other words, the first operation sections (or the functional keys 4A) are each configured to cause the terminal 1 to perform a single function (or a single first function). The keyboard 4 includes or has connected thereto a numeric keypad including two or more numeric keys 4B as second operation sections each for use to input a numeric character or a sign. The keyboard 4, in response to a second operation section (or a numeric key 4B) being operated (or pressed), transmits to the terminal 1 an operation signal 8 unique to the key. The terminal 1, in response to receiving an operation signal 8 transmitted in response to a second operation section (or a numeric key 4B) being operated (or pressed), performs one of two different functions, for example, receiving a numeric input as a first function or performing another function such as scrolling the screen as a second function. In other words, the second operation sections (or the numeric keys 4B) are each configured to cause the terminal 1 to perform a first function or a second function.

Figure 3:
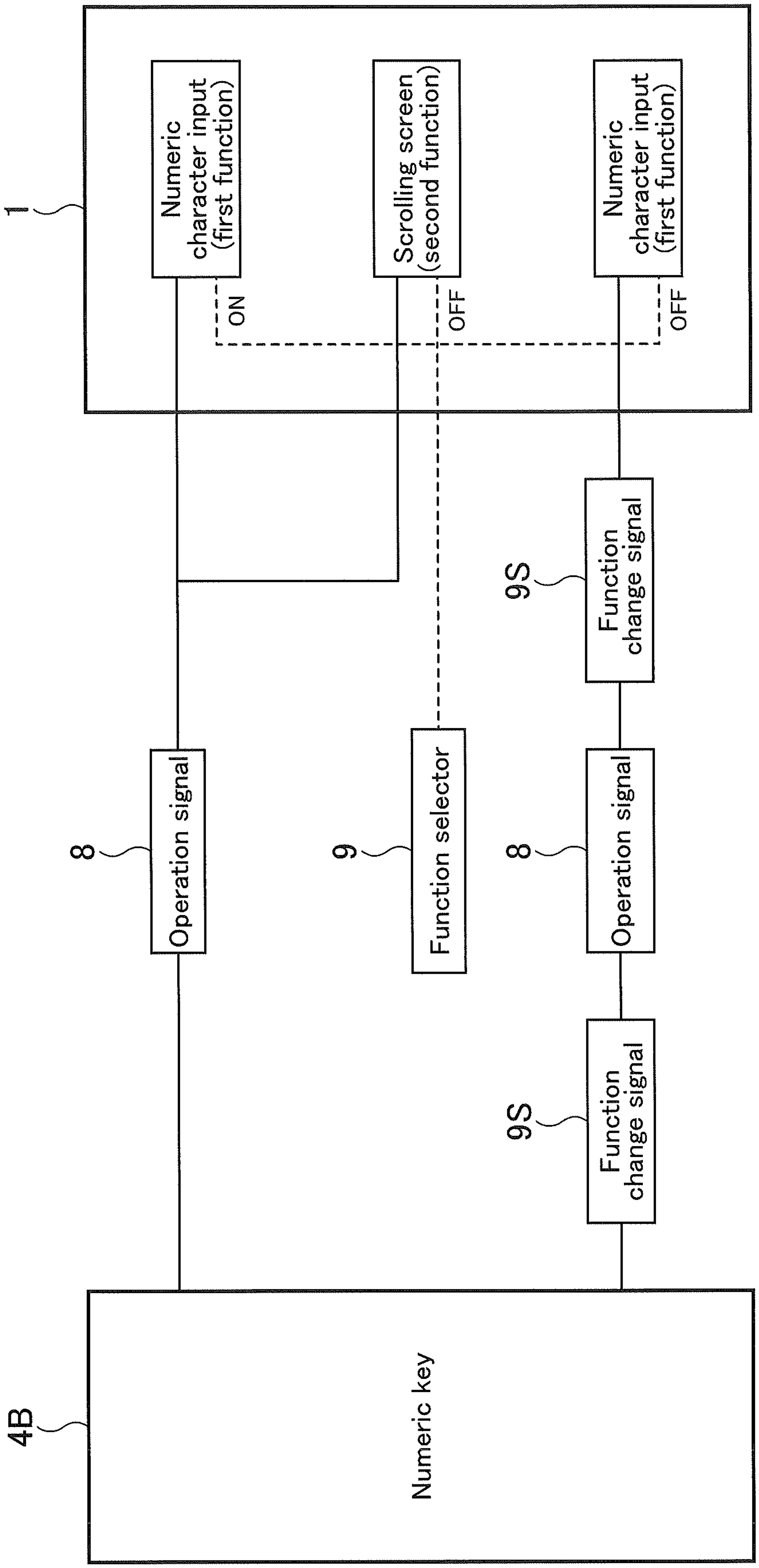
FIG. 3 is a diagram illustrating an example of a function mode and signals transmitted to a terminal.
Figure 4:
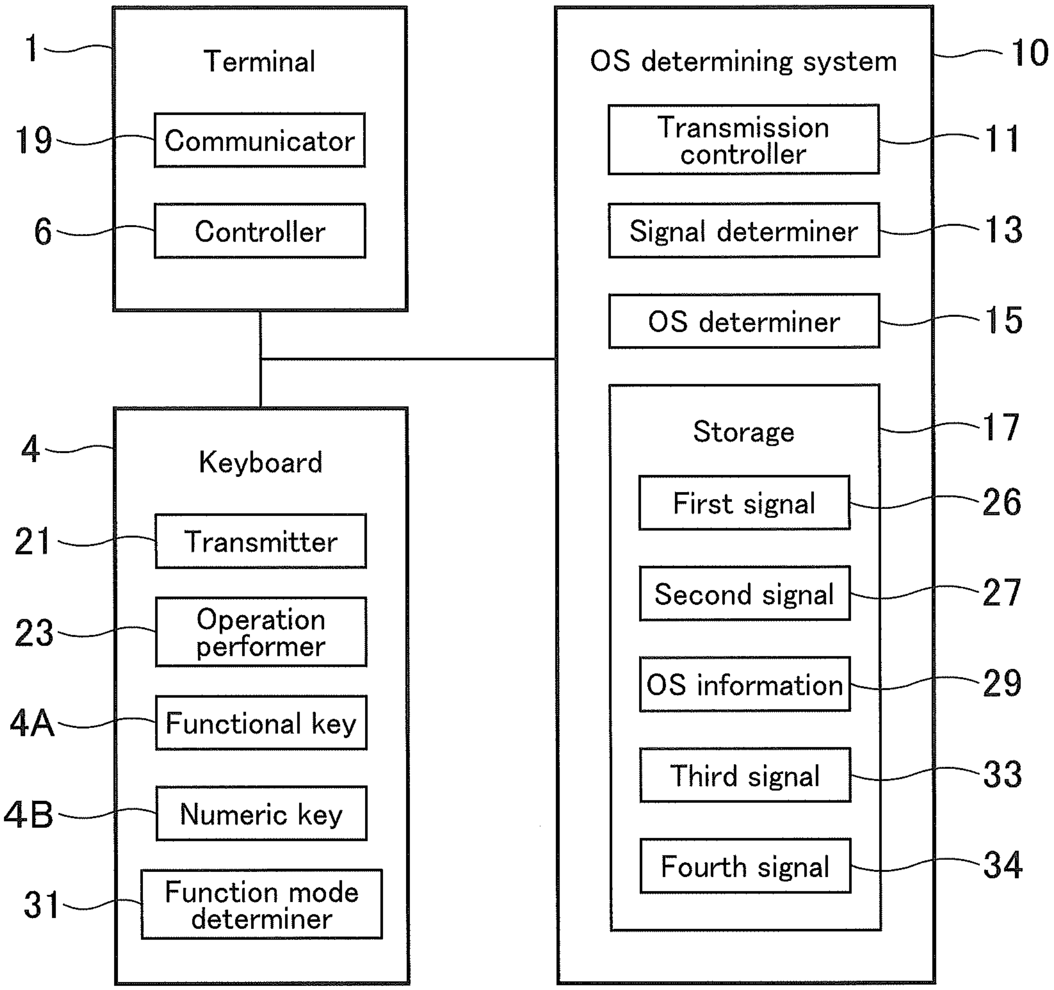
FIG. 4 is a diagram illustrating an example configuration of an operating system determining system.

Specifically, as illustrated in FIG. 3, the terminal 1, in response to a numeric key 4B being operated, receives a numeric input as a first function when the Num Lock mode is on or performs another function such as scrolling the screen as a second function when the Num Lock mode is off. In other words, pressing a numeric key 4B with the Num Lock mode on inputs a numeric character, whereas pressing a numeric key 4B with the Num Lock mode off causes the terminal 1 to perform another function corresponding to the numeric key 4B such as scrolling the screen. The terminal 1 performs a first function in response to a second operation section being operated with the Num Lock mode on and a second function in response to a second operation section being operated with the Num Lock mode off. The Num Lock mode may be switched on and off in response to an operation of, for example, a function selector 9 as a switch or key for switching the Num Lock mode. The function selector 9 serves as a toggle switch for switching the Num Lock mode on and off in response to each press. Operating the function selector 9 transmits a function change signal 9S (see FIG. 3) to the terminal 1.

The keyboard 4 as including the numeric keys 4B may include the function selector 9. The keyboard 4 as the present embodiment, however, preferably does not include the function selector 9. The keyboard 4 not including the function selector 9 reduces the risk of erroneously deactivating the Num Lock mode and allows the user to input numeric characters with use of the numeric keys 4B easily and continuously. The keyboard 4 as the present embodiment, in other words, allows the user to keep inputting numeric characters with use of the numeric keys 4B and easily perform a task involving numeric character input such as writing program code.

The first and second functions triggered by the numeric keys 4B as the second operation sections may or may not be switched depending on the OS that the terminal 1 has installed. Specifically, Windows (registered trademark) OSs allow the Num Lock mode to be switched on and off (or the Num Lock function to be performed), in which case deactivating the Num Lock mode allows the second function to be performed in response to a numeric key 4B being pressed. Other OSs, on the other hand, do not allow the user to deactivate the Num Lock mode. In other words, the terminal 1 is, if having a Windows (registered trademark) OS installed as a first OS, capable of selectively performing the first function or the second function.

[Outline of Control Depending on OS]

As described above, the OS of the terminal 1 determines the function that the terminal 1 is capable of performing. This renders it effective to determine what OS the terminal 1 has installed: Determining the OS of the terminal 1 allows the peripheral device to control the terminal 1 depending on the function that the terminal 1 is capable of performing. For instance, if the terminal 1 is capable of performing the Num Lock function (that is, switching the Num Lock mode on and off), the input device may be configured to perform different functions or transmit different signals to the terminal 1 in response to a single operation, depending on whether the Num Lock mode of the terminal 1 is on or off.

The determiner may, in the above case, be configured to determine the function that the terminal 1 is set to perform and change, for example, how the terminal 1 operates, depending on the determination result. In other words, the determiner may be configured to determine at least either the OS that the terminal 1 has installed or the function that the terminal 1 is set to perform and select how the terminal 1 or the peripheral device operates, depending on the determination result.

The description below assumes that the terminal 1 has connected thereto a keyboard 4 described above with reference to FIG. 2 as an example input device or peripheral device, and with reference to FIGS. 1, 2, and 3 to 5, deals with how pressing the numeric keys 4B inputs numeric characters into the terminal 1 regardless of whether the Num Lock mode is on or off.

[System for Determining OS]

The present embodiment includes an OS determining system 10 configured to transmit and receive data to and from the terminal 1 (which has an OS installed) and the keyboard 4. The OS determining system 10 includes a transmission controller 11, a signal determiner 13, an OS determiner 15, and a storage 17. The OS determining system 10 also includes a processor such as a CPU configured to control the respective operations of the functional blocks such as the transmission controller 11.

The terminal 1 includes not only the controller 6 (which is configured to operate on the OS) but also a communicator 19 configured to communicate with, for example, the OS determining system 10 and the keyboard 4. The terminal 1 has installed a Windows (registered trademark) OS as a first OS capable of causing the terminal 1 to perform a predetermined function such as the Num Lock function and having the function of, in response to receiving a predetermined first signal 26, transmitting a predetermined second signal 27.

The transmission controller 11 is configured to transmit a predetermined signal to the terminal 1 to determine what OS the terminal 1 has installed. Specifically, the transmission controller 11 transmits a first signal 26 to the terminal 1.

The signal determiner 13 is configured to determine whether the terminal 1 has transmitted a signal. Specifically, the signal determiner 13 determines whether the terminal 1 has transmitted a second signal 27 after the transmission controller 11 transmitted a first signal 26 to the terminal 1.

The OS determiner 15 is configured to, in response to the signal determiner 13 determining that the terminal 1 has transmitted a second signal 27 after the transmission controller 11 transmitted a first signal 26 to the terminal 1, determine that the OS that the terminal 1 has installed is the first OS. The OS determiner 15 may be configured to determine whether the OS that the terminal 1 has installed is the first OS by a means other than transmitting a first signal 26 and receiving a second signal 27.

The storage 17 is configured to store, as necessary, information corresponding to the first signal 26 and the second signal 27 as well as OS information 29 indicative of, for example, the type of the OS that the terminal 1 has installed.

[Keyboard]

The keyboard 4 is connected to the terminal 1 and the OS determining system 10 and includes a transmitter 21 in addition to the functional keys 4A and the numeric keys 4B as operation sections. The transmitter 21 is configured to transmit information to the terminal 1 and transmit an operation signal 8 corresponding to the key having been operated (or pressed). The transmitter 21 may be configured to automatically transmit a predetermined signal (that is, a first signal 26) to the terminal 1 under control of the transmission controller 11 of the OS determining system 10.

The keyboard 4 also includes an operation performer 23 configured to, in response to a numeric key 4B (or a second operation section) being operated (or pressed), cause the terminal 1 to perform the function (that is, the first function) of receiving the resulting signal as indicative of the numeric character corresponding to the key pressed, regardless of the Num Lock mode. The operation performer 23 is not necessarily included in the keyboard 4, and may be included in the OS determining system 10, the terminal 1, or another device.

[Numeric Character Input]

The present embodiment is configured to cause the terminal 1 to, in response to a numeric key 4B of the keyboard 4 being operated (or pressed), perform the function (that is, the first function) of receiving the resulting signal as indicative of the corresponding numeric character. The present embodiment assumes that the terminal 1 has installed a Windows (registered trademark) OS, a Mac (registered trademark) OS, or a Chrome (registered trademark) OS and that the first OS is a Windows (registered trademark) OS capable of performing the Num Lock function (or the first function).

Connecting the keyboard 4 to the terminal 1 (step #1 in FIG. 5) causes the OS determining system 10 to determine the type of the OS that the terminal 1 has installed.

Figure 5:
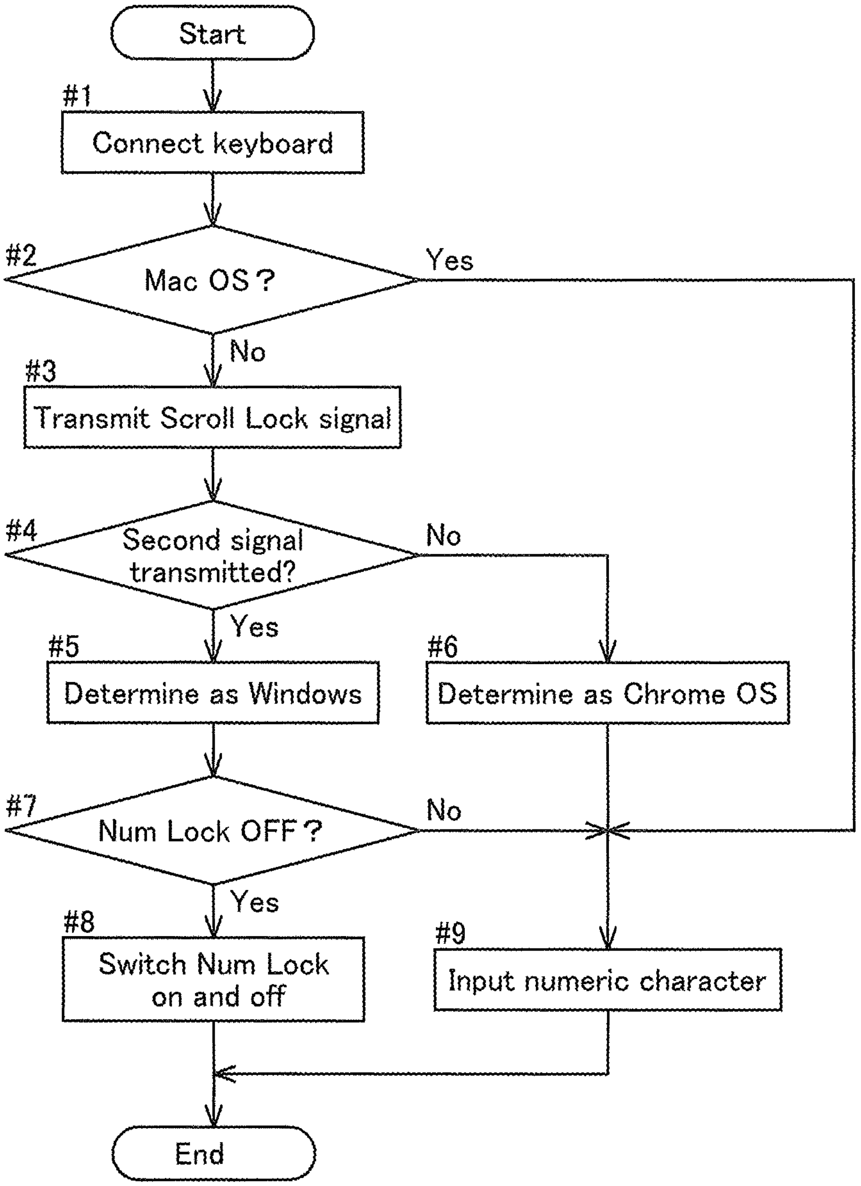
FIG. 5 is a flowchart of an example of how an operating system is determined.

First, the OS determining system 10 determines whether the OS of the terminal 1 is a Mac (registered trademark) OS (step #2 in FIG. 5). For instance, the user connects the keyboard 4 wirelessly to the terminal 1 with use of a USB-compliant device. Once the keyboard 4 has been USB-connected to the terminal 1, the keyboard 4 and the terminal 1 start data communication therebetween. If the terminal 1 has a Mac (registered trademark) OS installed, the keyboard 4 and the terminal 1 transmit and receive predetermined signals to and from each other. If the terminal 1 has an OS other than a Mac (registered trademark) OS installed, the keyboard 4 and the terminal 1 transmit and receive no predetermined signals to and from each other. The OS determining system 10, in response to the keyboard 4 being USB-connected to the terminal 1, determines whether the keyboard 4 and the terminal 1 transmit and receive predetermined signals to and from each other. This allows the OS determining system 10 to determine whether the OS of the terminal 1 is a Mac (registered trademark) OS.

In response to determining that the OS of the terminal 1 is not a Mac (registered trademark) OS (No in step #2 in FIG. 5), the OS determining system 10 determines whether the OS of the terminal 1 is a Windows (registered trademark) OS or a Chrome (registered trademark) OS.

Specifically, the transmission controller 11 causes the keyboard 4 to automatically transmit to the terminal 1 a Scroll Lock signal as the first signal 26 (that is, a signal that the keyboard 4 transmits to the terminal 1 in response to the Scroll Lock key being operated) (step #3 in FIG. 5). The transmitter 21 of the keyboard 4 transmits the first signal 26 (that is, a Scroll Lock signal) to the terminal 1. The storage 17 may store, in advance, information corresponding to the first signal 26 (or a Scroll Lock signal). The first signal 26 is not necessarily a Scroll Lock signal, and may be any signal that causes the terminal 1 to transmit the second signal 27 to the keyboard 4.

After the transmitter 21 transmitted the first signal 26, the signal determiner 13 determines whether the terminal 1 has transmitted a second signal 27 (step #4 in FIG. 5). In response to determining that the terminal 1 has transmitted a second signal 27, the OS determiner 15 determines that the terminal 1 has the first OS installed. In other words, in response to determining that the terminal 1 has transmitted a second signal 27 (Yes in step #4 in FIG. 5), the OS determiner 15 determines that the terminal 1 has a Windows (registered trademark) OS installed as the first OS (step #5 in FIG. 5). In response to determining that the terminal 1 did not transmit a second signal 27 (for instance, the terminal 1 has transmitted a signal other than a second signal 27 or has transmitted no signal) (No in step #4 in FIG. 5), the OS determiner 15 determines that the terminal 1 has a Chrome (registered trademark) OS installed (step #6 in FIG. 5).

The keyboard 4 may include a function mode determiner 31 configured to, in response to the OS determiner 15 determining that the terminal 1 has the first OS installed, determine whether the terminal 1 is in a mode to perform the second function in response to a second operation section (or a numeric key 4B) being operated (that is, whether the Num Lock mode is off).

In response to the OS determiner 15 determining that the terminal 1 has a Windows (registered trademark) OS installed as the first OS (step #5 in FIG. 5), the function mode determiner 31 determines whether the terminal 1 is in a mode to perform the second function (that is, the Num Lock mode is off) (step #7 in FIG. 5). Specifically, the function mode determiner 31 transmits a predetermined third signal 33 to the terminal 1 and in response to the terminal 1 transmitting a predetermined fourth signal 34, determines that the terminal 1 is in a mode to perform the second function (that is, the Num Lock mode is off). The storage 17 of the OS determining system 10 or a storage device or the like included in the keyboard 4 may store information corresponding to the third signal 33 and the fourth signal 34.

In response to the function mode determiner 31 determining that the terminal 1 is in a mode to perform the second function (that is, the Num Lock mode is off) (Yes in step #7 in FIG. 5), the operation performer 23 causes the terminal 1 to perform the first function in response to a numeric key 4B being operated, in other words, causes the terminal 1 to switch the Num Lock mode on and off in response to a numeric key 4B being operated (step #8 in FIG. 5). Specifically, as illustrated in FIG. 3, the operation performer 23 transmits a function change signal 9S to the terminal 1 before the transmitter 21 transmits an operation signal 8 in response to a numeric key 4B being operated.

The operation performer 23 may be configured to, after the transmission of a function change signal 9S and an operation signal 8, transmit another function change signal 9S to the terminal 1. This allows the operation performer 23 to sequentially (i) switch the Num Lock mode on, (ii) transmit an operation signal 8 corresponding to the key operated, and (iii) switch back the Num Lock mode off, so that the terminal 1 restores its original mode after a numeric key 4B being operated.

If (i) the terminal 1 is in a mode to perform the first function (that is, the Num Lock mode is on) (No in step #7 in FIG. 5), if (ii) in response to determining that the terminal 1 did not transmit a second signal 27 (No in step #4 in FIG. 5), the OS determiner 15 has determined that the terminal 1 has a Chrome (registered trademark) OS installed (step #6 in FIG. 5), or if (iii) the OS determining system 10 has determined that the OS of the terminal 1 is a Mac (registered trademark) OS (Yes in step #2 in FIG. 5), the operation performer 23, as illustrated in FIG. 3, transmits to the terminal 1 an operation signal 8 corresponding to a numeric key 4B having been operated, the operation signal 8 serving to input a numeric character into the terminal 1 (step #9 in FIG. 5).

The above configuration allows the operation performer 23 to, if the terminal 1 is in a mode to perform the second function (that is, the Num Lock mode is off), transmit a function change signal 9S to the terminal 1 to switch the Num Lock mode on (that is, so that the terminal 1 is in a mode to perform the first function) before the transmitter 21 transmits an operation signal 8 corresponding to a key operated. The above configuration allows the transmitter 21 to, if the terminal 1 is in a mode to perform the first function (that is, the Num Lock mode is on), simply transmit an operation signal 8 corresponding to a key operated and thereby input the corresponding numeric character. This allows the keyboard 4 to, regardless of whether the terminal 1 is in a mode to perform the second function (that is, the Num Lock mode is on) when the user presses a numeric key 4B, transmit to the terminal 1 a signal for inputting the numeric character corresponding to the key operated. The above configuration thereby allows the keyboard 4 as the present embodiment to, regardless of the mode of the terminal 1, input a numeric character corresponding to a key operated, allowing the user to easily use the keyboard 4 (input device), which has multiple functions.

ALTERNATIVE EMBODIMENTS (1) The embodiment described above may be altered such that the keyboard 4 includes a third operation section configured to cause the terminal 1 to perform a predetermined third function. The third operation section transmits a function control signal corresponding to the OS that the terminal 1 has installed. The function control signal serves to cause the terminal 1 to perform the third function, and varies depending on the OS. In other words, the keyboard 4, in response to the third operation section being operated, transmits a function control signal corresponding to the OS of the terminal 1 and serving to cause the terminal 1 to perform the third function. If, for instance, the keyboard 4 includes a screen shot key as the third operation section, pressing the screen shot key causes the terminal 1 to capture a screen shot as the third function. In this case, the keyboard 4 transmits to the terminal 1 a function control signal that varies between a case where the terminal 1 has a Windows (registered trademark) OS installed and a case where the terminal 1 has a Mac (registered trademark) OS or a Chrome (registered trademark) OS installed.

The keyboard 4 determines the OS of the terminal 1, and in response to the third operation section being operated, transmits to the terminal 1 a function control signal corresponding to the OS. In other words, the keyboard 4, in response to the third operation section being operated, transmits to the terminal 1 a function control signal that varies depending on the OS determined. Specifically, if the OS determiner 15 has determined that the terminal 1 has a Windows (registered trademark) OS installed, the operation performer 23 of the keyboard 4, in response to the third operation section (or the screen shot key) being operated, transmits to the terminal 1 a first function control signal corresponding to the Windows (registered trademark) OS and serving to cause the terminal 1 to perform the third function (or capture a screen shot). The operation performer 23 may be configured to, if the OS determiner 15 has determined that the terminal 1 has a Mac (registered trademark) OS installed, transmit to the terminal 1 a function control signal other than the first function control signal corresponding to the Mac (registered trademark) OS and serving to cause the terminal 1 to perform the third function (or capture a screen shot). The operation performer 23 may be configured to, if the OS determiner 15 has determined that the terminal 1 has a Chrome (registered trademark) OS installed, transmit to the terminal 1 a function control signal other than the first function control signal corresponding to the Chrome (registered trademark) OS and serving to cause the terminal 1 to perform the third function (or capture a screen shot).

The above configuration allows the keyboard 4, which is capable of transmitting a function control signal that varies depending on the OS of the terminal 1, to transmit a function control signal corresponding to the OS of the terminal 1 as the determination result to cause the terminal 1 to perform a single function. This in turn allows the user to easily cause the terminal 1 to perform a function corresponding to an operation of the keyboard 4.

(2) The embodiments described above may each be altered such that the function mode determiner 31 is included in the OS determining system 10 or any other device other than the keyboard 4. This allows the user to easily use the input device (or the keyboard 4), which has multiple functions, regardless of the configuration.

(3) The above alternative embodiments may each be altered such that the peripheral device is, for example, an input device connectable to the terminal 1 other than the keyboard 4. The second operation sections may be any operation sections other than numeric keys 4B. This allows the user to easily use any of various input devices having multiple functions. The first function is not necessarily for inputting a numeric character. The second operation sections are each configured to cause the terminal 1 to perform a second function other than the first function. In other words, the second operation sections are each not necessarily configured such that the Num Lock mode is switchable on and off, and are each simply configured such that two different functions are switchable.

(4) The above alternative embodiments may each be altered for control other than controlling input from an input device. The present invention is applicable to controlling various operations of a device. This allows the user to easily use any of various input devices having multiple functions.

(5) The embodiments described above may each be altered such that at least either the OS determining system 10 or the keyboard 4 includes any functional blocks other than the above. For instance, the functional blocks may each be divided further, or a portion of or the entire functional block may be combined with another functional block. Further, at least either the OS determining system 10 or the keyboard 4 may include an additional functional block. The functional blocks of the OS determining system 10 may each be included in the terminal 1, the keyboard 4, or another device. The functional blocks of the OS determining system 10 may all be included in a single device, or may be included in multiple devices. The functions of at least either the OS determining system 10 or the keyboard 4 may be performed by functional blocks other than the above. One or more or all of the functions of at least either the OS determining system 10 or the keyboard 4 may be performed by software. Programs as such software are stored in a storage device such as the storage 17 and executed by a processor such as a CPU included in the terminal 1, the OS determining system 10, or the keyboard 4, or a separate processor.

INDUSTRIAL APPLICABILITY

The present invention is applicable to a terminal having an OS installed and to a peripheral device for the terminal.

REFERENCE SIGNS LIST

1 Terminal
4 Keyboard (input device, peripheral device)
4A Functional key (first operation section)
4B Numeric key (second operation section)
8 Operation signal
9 Function selector
9S Function change signal
10 OS determining system
11 Transmission controller
13 Signal determiner
15 OS determiner
21 Transmitter
23 Operation performer
26 First signal
27 Second signal

31 Function mode determiner

33 Third signal

34 Fourth signal

The invention claimed is:

1. An operating system determining system for determining an operating system installed on a terminal to which a peripheral device is connectable, the terminal being capable of having installed at least one operating system including a first operating system configured to, in response to receiving a first signal, transmitting a second signal, the operating system determining system comprising:

a transmission controller configured to cause the peripheral device to automatically transmit the first signal to the terminal in response to the peripheral device being connected to the terminal;

a signal determiner configured to determine whether the terminal has transmitted the second signal; and an operating system determiner configured to, in response to the signal determiner determining that the terminal has transmitted the second signal, determine that the terminal has the first operating system installed.

2. An input device connectable to a terminal for use to input a command into the terminal, the terminal being capable of having installed at least one operating system including a first operating system configured to, in response to receiving a first signal, transmitting a second signal, the input device comprising:

a transmitter configured to transmit information to the terminal and automatically transmit the first signal to the terminal in response to the input device being connected to the terminal;

a signal determiner configured to determine whether the input device has received the second signal from the terminal; and an operating system determiner configured to, in response to the signal determiner determining that the input device has received the second signal from the terminal, determine that the terminal has the first operating system installed.

3. The input device according to claim 2, further comprising:

a plurality of first operation sections each configured to cause the terminal to perform a function; and at least one second operation section configured to cause the terminal to perform a first function or a second function, wherein with the first operating system installed, the terminal is configured to selectively perform the first function or the second function, the input device includes no function selector configured to select a function that the terminal performs in response to the at least one second operation section being operated, the input device further comprises:

a function mode determiner configured to, in response to the operating system determiner determining that the terminal has the first operating system installed, determine whether the terminal is in a mode to perform the second function in response to the at least one second operation section being operated; and an operation performer configured to, in response to the function mode determiner determining that the terminal is in a mode to perform the second function, cause the terminal to perform the first function in response to the at least one second operation section being operated.

4. The input device according to claim 3, wherein the function mode determiner is configured to transmit a third signal to the terminal and determine in response to the terminal transmitting a fourth signal that the terminal is in a mode to perform the second function.

5. The input device according to claim 3, wherein the at least one second operation section is a numeric key, and the first function is a number lock function.

6. The input device according to claim 3, wherein the at least one second operation section is each configured to transmit a unique operation signal to the terminal in response to being operated, the terminal is configured to, in response to receiving the operation signal, perform a function that varies between a case where the terminal is in a mode to perform the first function and a case where the terminal is in a mode to perform the second function, and the operation performer is configured to transmit a function change signal to the terminal before the at least one second operation section transmits the operation signal to the terminal, the function change signal serving to change the function that the terminal performs in response to the at least one second operation section being operated.

7. The input device according to claim 6, wherein the operation performer is configured to transmit the function change signal to the terminal again after the at least one second operation section transmits the operation signal to the terminal.

8. The input device according to claim 2, further comprising:

a third operation section configured to cause the terminal to perform a third function; and an operation performer configured to (i) in response to the third operation section being operated after the operating system determiner determines that the terminal has the first operating system installed, transmit to the terminal a first function control signal as a function control signal for causing the terminal to perform the third function and (ii) in response to the third operation section being operated after the operating system determiner determines that the terminal has an operating system installed other than the first operating system, transmit to the terminal a second function control signal as the function control signal.

* * * * *